US008932494B2

(12) United States Patent
Liao et al.

(10) Patent No.: US 8,932,494 B2
(45) Date of Patent: Jan. 13, 2015

(54) PHOTO-IRRADIATION OF BASE FORMS OF POLYANILINE WITH PHOTO ACID GENERATORS TO FORM CONDUCTIVE COMPOSITES

(75) Inventors: Yi Liao, Orlando, FL (US); Zheng Shi, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 864 days.

(21) Appl. No.: 13/099,971

(22) Filed: May 3, 2011

(65) Prior Publication Data

US 2011/0266532 A1 Nov. 3, 2011

Related U.S. Application Data

(60) Provisional application No. 61/330,707, filed on May 3, 2010.

(51) Int. Cl.
*C09B 67/00* (2006.01)
*H01B 1/12* (2006.01)

(52) U.S. Cl.
CPC ...................................... *H01B 1/128* (2013.01)
USPC ....................................................... 252/501.1

(58) Field of Classification Search
None
See application file for complete search history.

(56) References Cited

U.S. PATENT DOCUMENTS 6,685,853 B1 * 2/2004 Angelopoulos et al. ....... 252/500
2008/0164464 A1 * 7/2008 Kato ............................... 257/40
2010/0078598 A1 * 4/2010 Lee et al. ................... 252/501.1
2010/0127250 A1 5/2010 Salzillo et al.
2014/0020939 A1 * 1/2014 NISHIO et al. ............... 174/257

OTHER PUBLICATIONS

Venugopal et al., "Photoinduced Doping and Photolithography of Methyl-Substituted Polyaniline," Chem. Mater. 7, pp. 271-276 (1995).*
Salavagione, H.J., "Photolithographic Patterning of a Conducting Polymer Photoacid Generator and a Traceless Removable Group," Macromol. Rapid Commun. 27, pp. 26-30 (2006).*
Lee, C.W., "Synthesis and Properties of Tailor-Made Supramolecular Photo Acid Generators for Conducting Patterns of Polyaniline," Chem. Mater., 17, pp, 366-372 (2005).*
Zheng Shi, et al., "Photoinduced Protonation of Polyaniline Assisted by Hydrogen-Bonding Materials", Chemistry Department, University of Central Florida.

* cited by examiner

*Primary Examiner* — Harold Pyon
*Assistant Examiner* — Jaison Thomas
(74) *Attorney, Agent, or Firm* — Jetter & Associates, P.A.

(57) ABSTRACT

A method for forming electrically conductive polyaniline (PANI)-based composites includes mixing a base form of PANI, a photo acid generator (PAG), and when the PAG does not hydrogen bond to the base form of PANI an additive which can form hydrogen bonds with the base form of PANI or PAG, together with at least one solvent to form a mixture. The solvent is removed from the mixture. After the removing, the mixture is photo-irradiated with a wavelength within an absorption band of the PAG for converting the base form of PANI to a salt form of PANI to form a polymer composite that includes the salt form of PANI. The polymer composite has a 25° C. electrical conductivity that is at least 3 orders of magnitude higher than a 25° C. electrical conductivity of the base form of PANI, such as a 25° C. electrical conductivity of ≥0.01 S/cm.

20 Claims, 3 Drawing Sheets

100

PHOTO-IRRADIATION OF BASE FORMS OF POLYANILINE WITH PHOTO ACID GENERATORS TO FORM CONDUCTIVE COMPOSITES

CROSS REFERENCE TO RELATED APPLICATIONS

This application claims the benefit of Provisional Application Ser. No. 61/330,707 entitled "PHOTO-IRRADIATION OF BASE FORMS OF POLYANILINE WITH PHOTO ACID GENERATORS TO FORM INCREASED CONDUCTIVITY COMPOSITES", filed May 3, 2010, which is herein incorporated by reference in its entirety.

STATEMENT REGARDING FEDERALLY SPONSORED RESEARCH

This invention was made with Government support under Agency Contract Number FA9550-09-1-0628 awarded by the Air Force Office of Scientific Research. The government has certain rights in this invention.

FIELD

Disclosed embodiments relate to photo-irradiation processing of base forms of polyaniline in the presence of a photo acid generator to form polymer composites, and polymer composites and electronic articles therefrom.

BACKGROUND

Polyaniline (PANI) salts are known to be electrically conducting. It has been suggested that partially conjugated polymers such as one of the PANI bases (e.g., the emeraldine base (EB) form of PANI) that are dielectrics at 25° C. having an electrical conductivity $<1\times10^{-7}$ S/cm when combined with a photo acid generator (PAG) could be converted from being a dielectric to at least a semiconductor by photo-irradiation. Although there has been significant research in this area, including journal articles and patents, this work has provided only slight increases in electrical conductivity, such as by one or two orders of magnitude to about $10^{-5}$ S/cm. Electrical conductivities higher than about $10^{-2}$ S/cm have only been achieved by subsequent acid treatment, such as by hydrochloric acid (HCl) or camphor sulphonic acid (CSA) treatment, which not only adds an additional step, but can also significant limit potential applications because of process incompatibilities.

SUMMARY

A method for forming electrically conductive polyaniline (PANI)-based composites includes mixing a base form of PANI, a photo acid generator (PAG), and when the PAG does not hydrogen bond to the base form of PANI an additive which can form hydrogen bonds with at least one of the base form of PANI and PAG, together with at least one solvent to form a mixture. The solvent is removed from the mixture. After the removing, the mixture is photo-irradiated with a wavelength within an absorption band of the PAG for converting the base form of PANI to a salt form of PANI to form a polymer composite that includes the salt form of PANI. The polymer composite has a 25° C. electrical conductivity that is at least 3 orders of magnitude higher than a 25° C. electrical conductivity of the base form of PANI.

Polymer composites having a 25° C. electrical conductivity of ≥0.01 S/cm, as well as electronic articles including disclosed polymer composites, are also disclosed. One disclosed embodiment is an electronic article including a multi-level metal interconnect structure that includes electrically conductive traces that comprise disclosed electrically conductive polymer composite regions.

DETAILED DESCRIPTION

Figure 1:
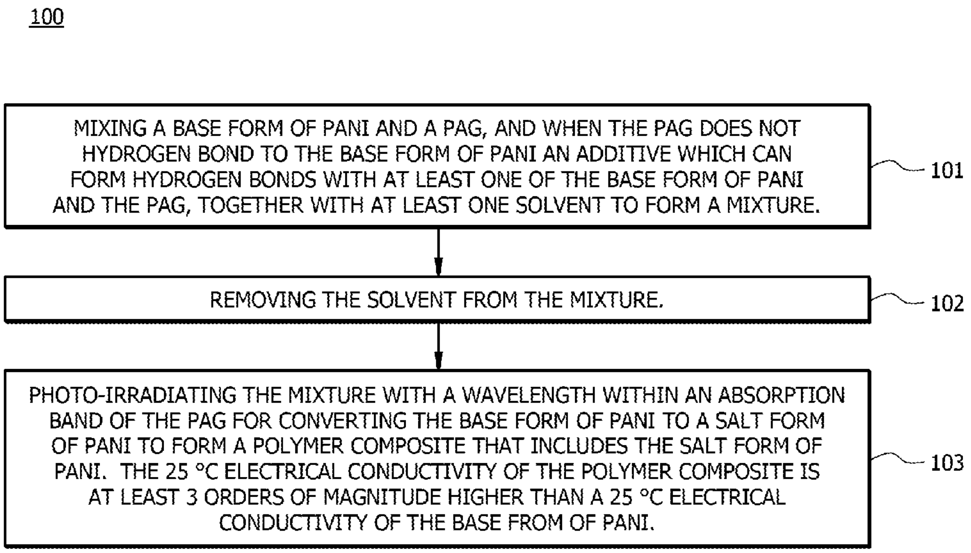
FIG. 1 is a flow chart that shows steps in an example method for forming electrically conductive composites from mixtures including the base form of PANI and a PAG, according to a disclosed embodiment.

Disclosed embodiments are described with reference to the attached figures, wherein like reference numerals, are used throughout the figures to designate similar or equivalent elements. The figures are not drawn to scale and they are provided merely to illustrate subject matter disclosed herein. Several disclosed aspects are described below with reference to example applications for illustration. It should be understood that numerous specific details, relationships, and methods are set forth to provide a full understanding of subject matter in this Disclosure. One having ordinary skill in the relevant art, however, will readily recognize that embodiments of the invention can be practiced without one or more of the specific details or with other methods. In other instances, well-known structures or operations are not shown in detail to avoid obscuring certain detail. This Disclosure not limited by the illustrated ordering of acts or events, as some acts may occur in different orders and/or concurrently with other acts or events. Furthermore, not all illustrated acts or events are required to implement a methodology in accordance with this Disclosure.

The Inventors have discovered that mixing partially conjugated polymers such as one of the base forms of PANI, a PAG, and also an additive when the PAG does not hydrogen bond to the base form of PANI where the additive can form hydrogen bonds with the base form of PANI and/or the PAG, and irradiating the mixture using a wavelength within an absorption band of the PAG, results in the formation of a polymer composite that includes the salt form of the PANI. Such composites can provide a 25° C. electrical conductivity that can be 5 orders of magnitudes (or more) over the 25° C. electrical conductivity of the composite before (or without) irradiation. In the particular case the additive comprises polyvinyl alcohol (PVA), the 25° C. electrical conductivity increase with PVA has been found to be at least 3 orders of magnitude higher than the 25° C. electrical conductivity of the base form of PANI of an otherwise equivalent blend without PVA.

Although disclosed embodiments can be practiced with polymers other than PANI, since PANI is a low cost material, PANI will be the polymer generally described herein. The electrical and optical properties of the PANI polymers vary with the different oxidation states and the different forms. Each oxidation state can exist in the form of its base or in its protonated form (salt) by treatment of the base with an acid. For example, base forms of PANI include the leucoemeraldine base, EB base and pernigraniline base form, which are all electrically insulating/dielectric, while the emeraldine salt (protonated) form of PANI is electrically conductive.

FIG. 1 is a flow chart that shows steps in an example method 100 for forming electrically conductive composites from mixtures including the base form of PANI and a PAG, according to a disclosed embodiment. Step 101 comprises mixing a base form of PANI, and a PAG, and when the PAG does not hydrogen bond to the base form of PANI an additive which can form hydrogen bonds with at least one of the base form of PANI and the PAG, together with at least one solvent to form a mixture. In step 102 the solvent is removed from the mixture. Step 103 comprises photo-irradiating the mixture with a wavelength within an absorption band of the PAG for converting the base form of PANI to a salt form of PANI to form a polymer composite that includes the salt form of PANI. The 25° C. electrical conductivity of the polymer composite is at least 3 orders of magnitude higher than the 25° C. electrical conductivity of the base form of PANI.

Disclosed electrically conductive polymer composites based on PANI are generally air-stable, inexpensive and can be tailored to respond to certain wavelengths by selection of the PAG. Precursors of such composite materials can be used in direct photo-patterning of electrically conducting circuits on insulating materials (the non-irradiated part remains electrically insulating) without the need for photolithography and depositing extra materials as described below, and thus can find applications in electronics, especially organic electronics.

Figure 2A:
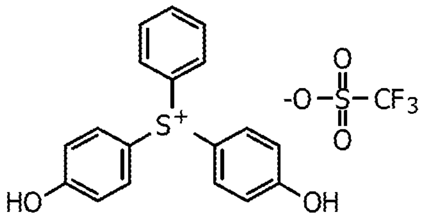
FIG. 2A depicts an example PAG with hydrogen bonding ability comprising OH modified triphenylsulfonium triflate.

Regarding the PAG, when the hydrogen-bonding additives are included, the PAG can have, or not have, hydrogen bonding ability. For PAGs without hydrogen bonding abilities, all types of common PAGs can generally be used such as sulfonium salts, iodonium salts, and non-ionic PAGs such as sulfonates can also be used. One way of providing PAGs with hydrogen bonding ability is by adding hydroxyl groups (OH) onto the PAG which allows them to form hydrogen bonds with PANI. One example is OH modified triphenylsulfonium triflate, shown in FIG. 2A.

Figure 2B:
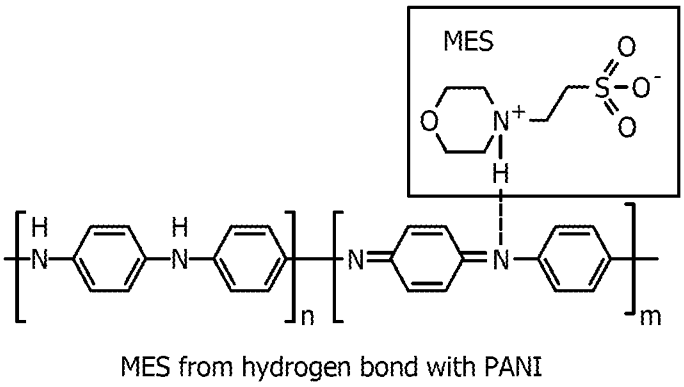
FIG. 2B depicts an example small molecule additive that can form hydrogen bonds with PANI and assist in proton transfer to PANI comprising 2-(N-morpholino)ethanesulfonic acid (MES).

As described above, when the PAG does not hydrogen bond to the base form of PANI, an additive which can form hydrogen bonds with the base form of PANI and/or the PAG is generally added. The additive can be selected from polymers that can form hydrogen bonds with PANI and themselves. Examples of such polymer include PVA, poly vinyl phenol, polyamides (i.e., different type of nylons). The 25° C. electrical conductivity of composites of PANI/PAG (triphenylsulfonium triflate)/PVA has been found to increase up to over 7 order of magnitude to $10^{-2}$ to $10^{-1}$ S/cm with good reproducibility. The additive can also comprise small molecules that can form hydrogen bonds with PANI and assist in proton transfer to the PANI. A small molecule example is 2-(N-morpholino)ethanesulfonic acid (MES). MES is a salt or weak acid. MES can form hydrogen bonds with PANI as depicted in FIG. 2B. The 25° C. electrical conductivity of a PANI/PAG (triphenylsulfonium triflate)/MES composite was found to increase to about 1 S/cm after irradiation at 254 nm.

The additive does not necessarily have acidic protons. For example, it was discovered that polyethylene glycol (PEG) is also an effective additive. PEG assists proton transfer by reversibly binding to protons with the basic oxygen atom, and can form hydrogen bonds with PANI. It was found that composites with about a ~1:1:0.5 molar ratio of PANI-EB, PEG (Mn=550) and PAG (triphenylsulfonium triflate) can change their 25° C. conductivities from $<1\times10^{-7}$ S/cm to ~1 S/cm after being irradiated with 254 nm UV light.

Disclosed embodiments include electronic articles comprising an organic substrate, and at least one unpatterned (i.e., not etched; blanket) layer of a disclosed polymer composite having both high electrical conductivity portions and low electrical conductivity portions. The polymer composite can comprise a base form of PANI in the low conductivity regions and the salt form of PANI in the high conductivity regions, a PAG, and when the PAG does not provide hydrogen bonding capability to the base form of PANI an additive which can form hydrogen bonds with PANI and/or the PAG. The high electrical conductivity portions provide an electrical conductivity ≥0.01 S/cm at 25° C., and the low electrical conductivity portions provide an electrical conductivity $\leq1\times10^{-6}$ S/cm at 25° C.

Organic electronics can provide low cost and novel functionality, and are emerging as a viable alternative to traditional silicon-based electronics in some applications. Organic materials that can be converted from electrical insulators to at least semiconductors by photo-irradiation processes disclosed herein are of substantial interest since they can simplify current fabrication procedures of electronics, and lead to novel techniques for future electronics. For example, in the electronics industry, currently once various semiconductor devices have been created, they must be electrically interconnected to form the desired electrical circuits. The interconnection involves fabricating metal wires or traces on different layers of insulators by photolithography and vapor deposition, and constructing conducting holes, generally called "vias", to connect the wires or traces to the semiconductor devices such as transistors below the metal wires or traces. Since modern integrated circuits (ICs) often require many interconnection levels, the process has become complicated and is a major portion of cost.

Materials that can be converted from insulators to at least semiconductors by irradiation alone such as disclosed composites can significantly reduce the process complexity for electronic articles since constructing conducting wires/traces and vias can formed by photo or thermal irradiation alone, instead of multi-step deposition (e.g., vapor deposition), photolithography, and etching. Vias as disclosed herein can be formed by controlling the focal length (e.g., scanning through a plurality of different focal lengths) and the intensity of the irradiation applied to a disclosed polymer composite. In the near future, even before the overall properties are fully realized for commercialization, such materials could be used as tools to form new electronic materials and devices by allowing rapid "patterning" for customized circuits with micro/nano meter resolution for testing electronic properties of nanomaterials or novel electric configurations.

Figure 3A:
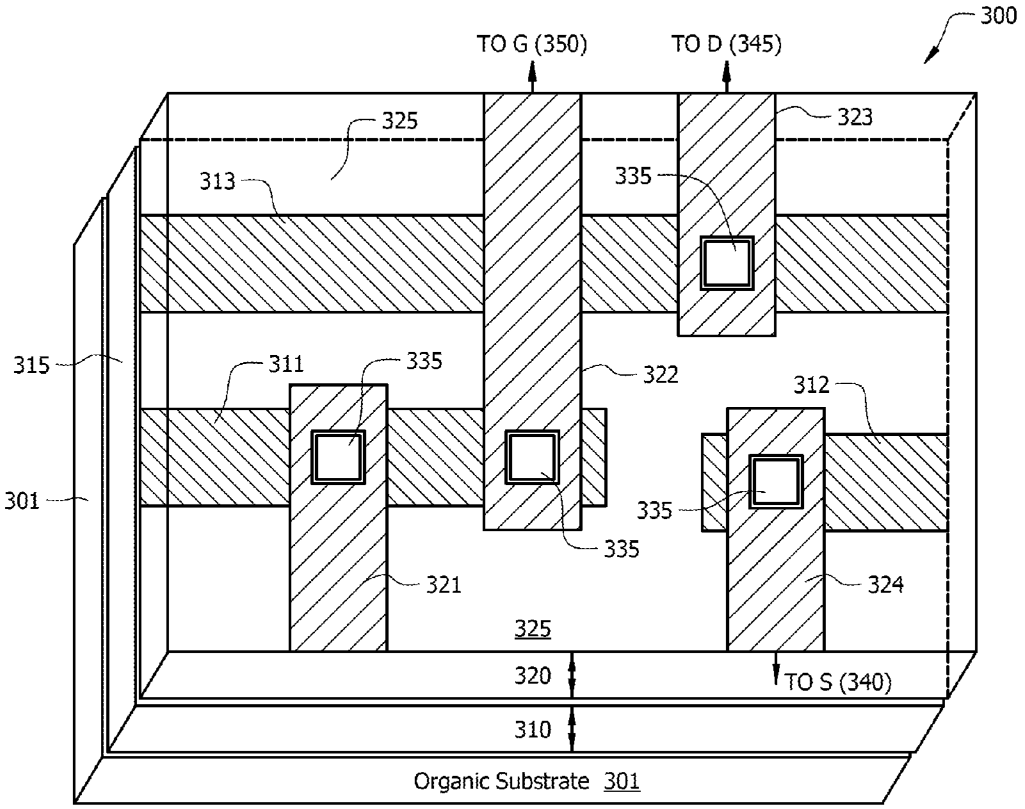
FIG. 3A depicts a portion of a multi-level metal interconnect structure of a thin film electronic article comprising a first unpatterned layer including electrically conductive interconnect lines and a second unpatterned layer including electrically conductive interconnect lines connected together by vias, that can all be provided by photo-irradiation, according to a disclosed embodiment.

FIG. 3A depicts a portion of a multi-level metal interconnect structure of a thin film electronic article 300 comprising a first unpatterned (i.e., non-etched) layer 310 including electrically conductive interconnect lines 311, 312, and 313, and a second unpatterned (i.e., non-etched) layer 320 including electrically conductive interconnect lines 321, 322, 323 and 324 connected together by vertically oriented vias 335 according to a disclosed embodiment. Electronic article 300 is shown formed on an organic substrate 301. As noted above, vias 335 can be provided by photo-irradiation by scanning through a plurality of different focal lengths to render the full thickness of a disclosed unpatterned PANI comprising composite layer over a given area electrically conductive.

Layer 310 includes dielectric regions 315 shown unshaded that electrically isolate electrically conductive interconnect lines 311, 312, and 313. Electrically conductive interconnect lines 311, 312, and 313 are on the top portion of layer 310, while dielectric regions 315 are thereunder that provide electrical isolation to structures underneath, as well as laterally between the interconnect lines 311-313. Layer 320 includes dielectric regions 325 shown unshaded that electrically isolate electrically conductive interconnect lines 321, 322, 323 and 324. Electrically conductive interconnect lines 321, 322, 323, and 324 are on the top portion of layer 320, while dielectric regions 325 are thereunder that provides electrical isolation to structures underneath, as well as laterally between the interconnect lines 321-324. Vias 335 can be formed by converting the full thickness of second layer 320 (e.g., by using multiple different focal lengths during irradiation) over selected areas using photo-irradiation to enable low resistance connections between electrically conductive interconnect lines in layer 320 to electrically conductive interconnect lines in layer 310.

Figure 3B:
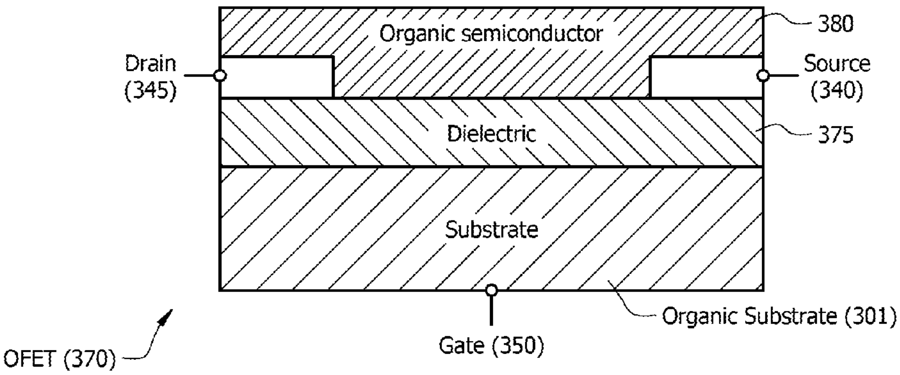
FIG. 3B is a simplified depiction of an example organic field effect transistor (OFET) that can have its respective terminals contacted by the multi-level metal interconnect structure depicted in FIG. 3A, according to a disclosed embodiment.

Interconnect line 322 is shown for connecting to the gate 350 of the organic field effect transistor (OFET) 370 depicted in FIG. 3B, while interconnect line 323 is shown for connecting to the drain 345 of OFET 370, while interconnect line 324 is shown for connecting to the source 340 of OFET 370. Vias for these respective connections are not shown for simplicity. OFET 370 comprises a dielectric layer 375 on organic substrate 301 that provides the gate dielectric for OFET 370, and the organic semiconductor 380 provides the region that is invertible (e.g., p-type to n-type) based on appropriate bias applied to gate 350 relative to the source 340. Although not shown in FIG. 3B, the source 340 and drain 345 can be fabricated directly on the dielectric layer using disclosed electrically conductive polymer composites.

Although irradiation is generally described herein for forming electrically conductive polymer composites including PANI salts, it may be possible to run disclosed methods in reverse by irradiation with a different wavelength or thermal heating, to basify the salt form of PANI to the base form of PANI that is a dielectric/insulator. For example, using a reversible PAG such as a phenolic acid that can form hydrogen bonds with PANI.

Embodiments of the invention may find applications in photolithography, drug delivery, photoresponsive materials and mechanistic research.

EXAMPLES

Embodiments of the invention are further illustrated by the following specific Examples, which should not be construed as limiting the scope or content of embodiments of the invention in any way.

Example 1

Formation of an Example Disclosed Composite

A mixture was formed comprising 60 mol % PANI (emeraldine base (EB) form), 20 mol % PAG, and 20 mol % PVA by the following method to form a polymer composite. In a typical procedure, 4.5 mg of PVA, 28 mg of PANI was added to 700 mg of the solvent 1-methyl-2-Pyrrolidinone (NMP) and was magnetically stirred for 1 h at 60° C. This solution was then added to 41 mg of triphenylsulfonium triflate and stirred for 15 mins. The resulting dark blue solution was then filtered through a 0.45 um filter. The filtered solution was spin casted on two gold electrodes with a gap of 1 mm. Subsequently, the film was placed in a vacuum oven at room temperature for 36 h to remove the NMP. The film of polymer composite showed an increase in electrical conductivity at 25° C. of over about 5 orders of magnitudes to ~0.01 S/cm after UV irradiation.

The OH groups of PVA were used to increase the proton ($H^+$) mobility, and was believed to thus help the $H^+$ to find the more basic imine (C═N) groups provided by the PANI. The percentages of the respective components were varied within 5% in different experiments. Two different PAGs comprising triphenylsulfonium triflate and N-hydroxynaphthylimide triflate (NITF) were tested and the irradiation wavelengths were chosen according to the absorption of the PAGs, using 254 nm and 365 nm wavelengths, respectively, for 1 hour. The measured 25° C. electrical conductivity following photo-irradiation was generally about 0.01 S/cm. It is noted that 0.01 S/cm may already be sufficient for many thin-film electronic devices. However, as disclosed above the 25° C. electrical conductivity of other composites such as a PANI/triphenylsulfonium triflate)/MES based composite was found to increase to about 1 S/cm after photo-irradiation.

Example 2

Synthesis of an Example PAG bis(p-hydroxyphenyl)phenylsulfoniumtriflate [$(PhOH)_2PhS^+$ $OTf^-$]]

This PAG was synthesized by reacting 300 mg of diphenyliodonium triflate with 152 mg of bis-para-dihydroxydiphenylsulfide in a pressure vessel. Copper(II) benzoate (6 mg) was added to it as a catalyst. This mixture was flushed with nitrogen carefully and set up to heat with stifling at precisely 125-130° C. for 3 hours. After the mixture cooled, 2 mL of ether was added. The mixture was sonicated and the cloudy ether was pipetted out. This procedure was repeated 3 times. Enough methanol (~2 mL) was added to dissolve the oil. The MeOH solution was washed with hexane 3 times, flash evaporated, and kept under vacuum overnight to yield the product. $^1$H NMR (300 MHz, DMSO) δ=10.998 (s, 2H), 7.746 (m, 4H), 7.672 (m, 5H), 7.123 (d, J=8.9 HZ, 4H). $^{13}$C NMR (500 MHz, MeOD): δ=112.7, 118.1, 127.3, 129.6, 131.0, 133.1, 133.5, 163.5. HRMS (ESI): $M^+$ [$(PhOH)_2PhS^+$] =295.0787, $[M-H+Na]^+$=317.0607.

While various embodiments of the invention have been described above, it should be understood that they have been presented by way of example only, and not as a limitation. Numerous changes to the disclosed embodiments can be made in accordance with the disclosure herein without departing from the spirit or scope of this Disclosure. Thus, the breadth and scope of the invention should not be limited by any of the above-described embodiments. Rather, the scope of the invention should be defined in accordance with the following claims and their equivalents.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

We claim:

1. A method for forming electrically conductive polyaniline (PANI)-based composites, comprising:

mixing a base form of PANI, and a photo acid generator (PAG) together with at least one solvent and, optionally, an additive which can form hydrogen bonds with at least one of said base form of PANI and said PAG to form a mixture;

removing said solvent from said mixture, and photo-irradiating said mixture after said removing with a wavelength within an absorption band of said PAG for converting said base form of PANI to a salt form of PANI to form a polymer composite that includes said salt form of PANI, wherein said polymer composite has a 25° C. electrical conductivity at least 5 orders of magnitude higher than a 25° C. electrical conductivity of said base form of PANI and wherein when said PAG does not hydrogen bond to said base form of PANI said additive is present in the mixture.

2. The method of claim 1, wherein said PAG hydrogen bonds to said base form of PANI, and wherein said mixture is exclusive of said additive.

3. The method of claim 1, wherein said PAG hydrogen bonds to said base form of PANI, and said mixture includes said additive.

4. The method of claim 1, wherein said PAG does not hydrogen bond to said base form of PANI, and said mixture includes said additive.

5. The method of claim 1, wherein said additive comprises polyvinyl alcohol (PVA).

6. The method of claim 1, wherein said additive comprises polyethylene glycol (PEG).

7. The method of claim 1, wherein said additive comprises 2-(N-morpholino)ethanesulfonic acid (MES).

8. The method of claim 1, wherein said base form of PANI comprises an emeraldine base (EB) form of PANI.

9. The method of claim 1, wherein said PAG comprises triphenylsulfonium triflate or N-hydroxynaphthylimide triflate (NITF).

10. The method of claim 1, wherein said electrical conductivity at 25° C. of said base form of PANI composite is $\leq 1\times10^{-7}$ S/cm and said electrical conductivity of said polymer composite at 25° C. is ≥0.01 S/cm.

11. The method of claim 1, wherein said photo-irradiating comprises irradiation of only selected areas of said mixture after said removing, wherein only said selected areas are converted to said salt form of PANI.

12. A polymer composite, comprising:

a salt form of PANI;

a photo acid generator (PAG), and when said PAG does not hydrogen bond to a base form of PANI an additive which can form hydrogen bonds with at least one of said base form of PANI and said PAG, wherein an electrical conductivity of said polymer composite at 25° C. is ≥0.01 S/cm.

13. The composite of claim 12, said PAG does not hydrogen bond to said base form of said PANI, and said composite includes said additive.

14. The composite of claim 13, wherein said additive comprises polyvinyl alcohol (PVA), polyethylene glycol (PEG) or 2-(N-morpholino)ethanesulfonic acid (MES).

15. The composite of claim 12, wherein said PAG hydrogen bonds to said base form of said PANI.

16. An electronic article, comprising:

an organic substrate, and at least one unpatterned layer of a polymer composite on said organic substrate having high electrical conductivity portions and low electrical conductivity portions;

wherein said high electrical conductivity portions provide an electrical conductivity at 25° C.≥0.01 S/cm and comprise:

a salt form of PANI;

a photo acid generator (PAG), and when said PAG does not hydrogen bond to a base form of PANI an additive which hydrogen bonds with said base form of PANI or said PAG, and wherein said low electrical conductivity portions provide an electrical conductivity 25° C.$\leq 1\times10^{-6}$ S/cm and comprise:

said base form of PANI;

said PAG, and said additive when said PAG does not hydrogen bond to said base form of PANI, and at least one organic field effect transistor (OFET) on said organic substrate having its respective terminals contacted by said respective ones of said high electrical conductivity portions.

17. The electronic article of claim 16, further comprising vias comprising said high electrical conductivity portions for contacting said respective terminals of said OFET.

18. The electronic article of claim 16, wherein said PAG hydrogen bonds to said base form of PANI.

19. The electronic article of claim 16, wherein said PAG does not hydrogen bond to said base form of PANI and said mixture includes said additive.

20. The electronic article of claim 16, wherein said additive comprises polyvinyl alcohol (PVA) or polyethylene glycol (PEG).

* * * * *